United States Patent [19]
Pearson et al.

[11] Patent Number: 5,577,775
[45] Date of Patent: Nov. 26, 1996

[54] BEARINGLESS COOLANT UNION

[75] Inventors: Dennis G. Pearson, Lake Zurich; Dean E. Wanders, Spring Grove, both of Ill.

[73] Assignee: Barco, A Division of Marison Industries, Cary, Ill.

[21] Appl. No.: 384,984

[22] Filed: Feb. 7, 1995

[51] Int. Cl.$^6$ ....................................................... F16L 35/00
[52] U.S. Cl. ............................. 285/24; 285/93; 285/279; 285/917; 29/428; 29/890.14
[58] Field of Search ............................. 285/98, 276, 278, 285/279, 280, 24, 93, 917; 29/428, 890.14

[56] References Cited

U.S. PATENT DOCUMENTS

| | | | |
|---|---|---|---|
| 2,805,086 | 9/1957 | Schumaker | 285/279 X |
| 3,405,959 | 10/1968 | Walker | 285/279 X |
| 3,889,983 | 6/1975 | Freize | 285/276 X |
| 4,296,952 | 10/1981 | McCracken | 285/276 X |
| 4,817,995 | 4/1989 | Deubler et al. | 285/276 X |
| 5,165,734 | 11/1992 | Smith | 285/281 X |
| 5,174,614 | 12/1992 | Kaleniecki | 285/281 X |
| 5,303,959 | 4/1994 | Medsker | 285/276 X |

*Primary Examiner*—Dave W. Arola
*Attorney, Agent, or Firm*—Baker & McKenzie

[57] ABSTRACT

A unitary, fully-assembled bearingless coolant union which transfers cooling fluid from a fluid source to an axial bore of a rotating spindle on a stationary machine. The union includes a main housing which holds in position both a rotor assembly and a stator assembly such that a rotating seal on the rotor assembly remains in fluid-tight contacting relation with a non-rotating seal on the stator assembly. Means are provided to allow the seal members to move axially with respect to the spindle's axis of rotation in response to axial movement by the spindle itself and to allow the inclination of the seal members from a plane transverse to this axis of rotation in response to minor misalignment of the rotor assembly from concentric relation with this axis of rotation. The two-step process for installing the union includes (1) attaching the end of the rotor assembly to a spindle, and (2) mounting the union's housing assembly upon the stationary machine within the allowable set-up tolerance.

12 Claims, 5 Drawing Sheets

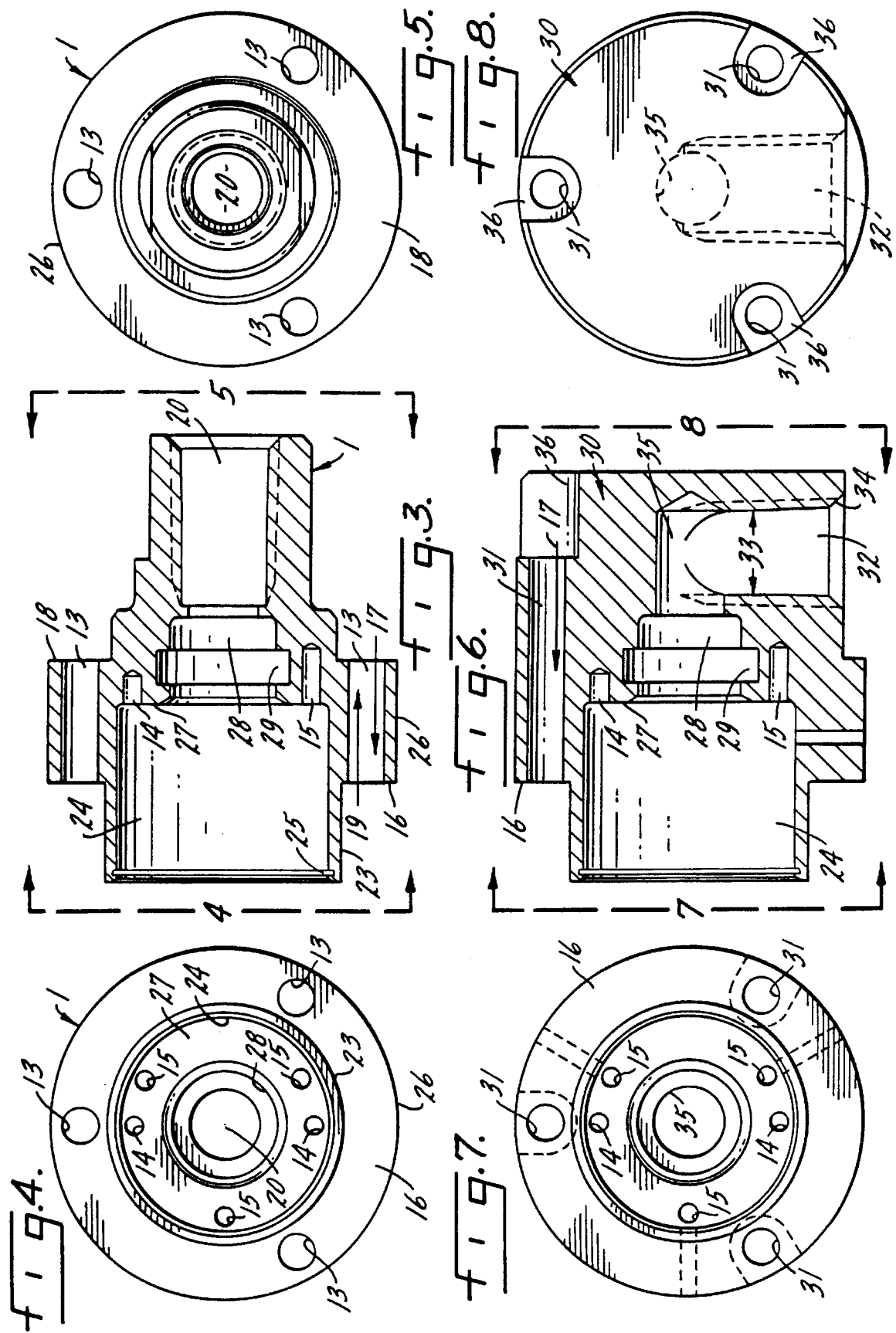

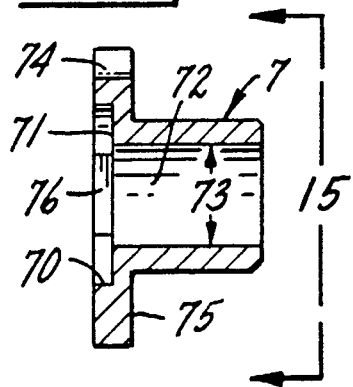
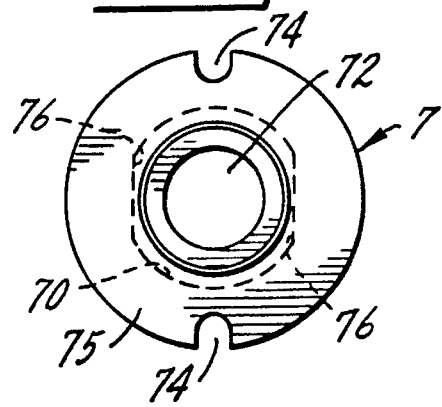
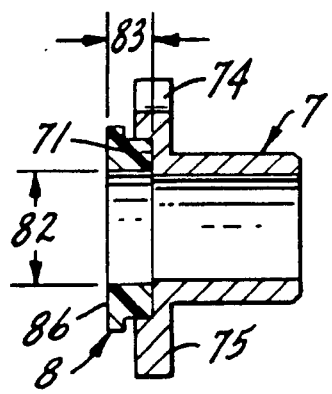
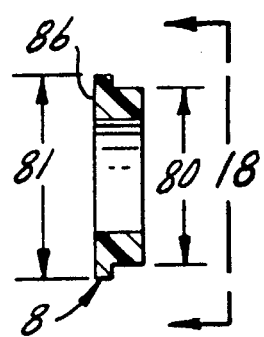
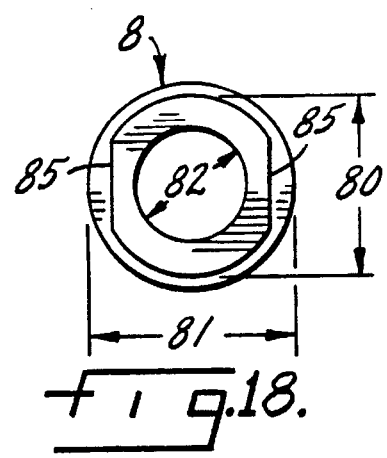
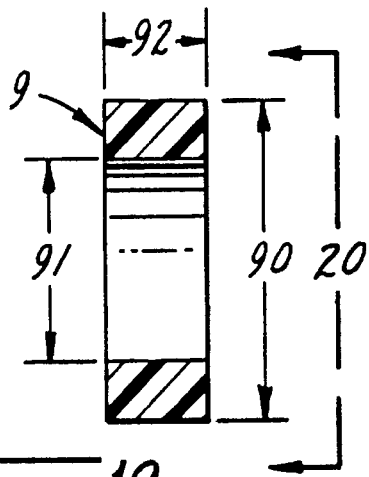
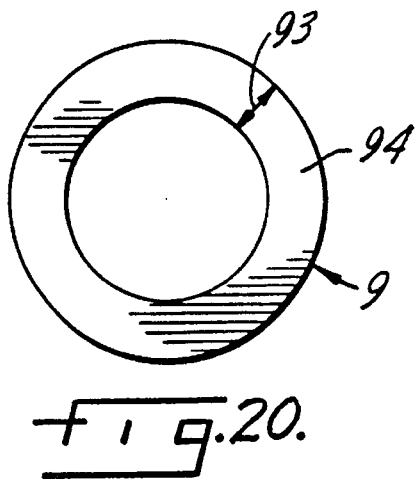

BEARINGLESS COOLANT UNION

BEARINGLESS COOLANT UNION

The present invention relates generally to fluid-tight rotating unions which couple the output of a fluid source to a rotating spindle of a machine and, more specifically, to a unitary bearingless coolant union having a pair of permanently-contacting and relatively-rotatable seal members between which a fluid seal is maintained.

BACKGROUND OF THE INVENTION

Many metal machining processes require the distribution of cooling fluid at a cutting tool edge in order to cool the tool, lubricate the cutting edge, remove metal chips from deep holes and, in some instances, to gauge the size of a machined feature. An effective and industry-proven method of applying such cooling fluid is through the use of a rotating fluid union. Unions which incorporate a rotating fluid seal between a pair of relatively rotating parts are well known in this field of the art. A leak tight connection is provided between the fluid supply and the cutting tool edge as the rotating union allows the passage of cooling fluid to the center of the spindle, the center of the cutting tool and directly to the cutting tool edge.

Typically, a rotary union includes a rotating seal member which is positioned in concentric relation to a stationary seal member within a single common housing. Means are provided to bias the two seal members against one and other such that their respective axial seal faces are in fluid-tight engagement. The rotating seal member is journaled on a bearing for rotation relative to both the stationary seal member and the single common housing and further includes a shaft which extends from the housing to be securely inserted within the rotating spindle for rotation therewith.

The standard mechanical ball bearing rotary union has proven to provide satisfactory service at relatively low rotational speeds, i.e. $\leq 4,000$ rpm, and at relatively low or moderate pressures. However, these types of unions often experience operational problems when an attempt is made to use them at relatively high rotational speeds, i.e. $\geq 5,000$ rpm, or at high pressures.

Various machining applications today require that a rotating union provide a reliable leak tight connection at high rotational speeds, i.e. approximately 10,000 rpm, and at coolant pressures upwards of 1,000 psi. Such high-production metal cutting machines are often employed in transfer lines and are used, for example, in the production of detailed components such as transmissions, engine blocks, cylinder heads, etc. The reliability of the rotating union is of critical importance in maintaining high production rates and machine "up-time."

Standard rotating unions have many shortcomings which adversely affect their overall reliability. Factors which must be considered in their application include: 1) A flexible hose connection is usually required between the stationary fluid supply and the rotating union to prevent undue loading upon the ball bearings. 2) An extremely accurate connection between the rotating union and the spindle is necessary to prevent vibration and wobble. If a connection is worn or damaged the entire union may vibrate, affecting not only union performance but also the accuracy and finish of the cutting tool. Short service life or catastrophic failure, such as a broken union sleeve, may result from such harmonic vibrations. 3) Advances in tooling and increased production rates necessarily require an increase in both speed and pressure. Bearing life has thus become an increasing problem. 4) Bearings are highly susceptible to grease contamination and wash-out from the splash or mist effect from the flow of cooling fluid.

A relatively recent development is a "bearingless" coolant union as shown, for example, in U.S. Pat. No. 5,174,614, issued Dec. 29, 1992 to Kaleniecki and entitled "Bearingless Rotary Mechanical Fluid Coupling." This union is intended to be rigidly mounted to the frame of a machine's spindle by means of a mounting adapter. Rigid mounting of the rotary union eliminated the need for bearings within the housing assembly as the rotor assembly is allowed to rotate freely with the spindle. Rigid mounting also allows the rotating union to be plumbed solid with the stationary machine. Loads from the plumbing connection are transferred directly to the machine's frame by means of a mounting adapter. Vibration is reduced as the only rotating member of the union is the sleeve which is supported by the machine's spindle bearings.

This early design of a bearingless coolant union eliminated some of the common causes of premature rotating union failure and thereby increased the union's reliability. However, there are still a variety of shortcomings associated with this particular bearingless design. Such bearingless unions are essentially "two-piece" devices; the first piece intended to rotate with a spindle and having a rotating seal, and the second piece intended to remain stationary and including a stationary seal. Prior to installation, both of these precision lapped seals are exposed to the environment and are susceptible to damage. Proper installation procedure requires not only a thorough cleaning and oiling of the seal faces, but also that exacting alignment steps be taken, often requiring the shimming of the union, to position the two pieces within the union's allowable set-up dimensions.

What is needed in this field of art is a unitary, bearingless fluid union which allows its rotor member to rotate freely with a machine's spindle, whose seals remain in constant fluid-tight abutment, and which features a simplified installation process which does not require the cleaning or alignment of its seal faces.

SUMMARY OF THE INVENTION

Accordingly, the present invention comprises a unitary, bearingless coolant union having constantly-engaged and relatively-rotating seals. The union is leak-tested at its production factory and is subsequently shipped to an end user in a fully-assembled condition. The primary components of this union include a main housing assembly, a rotor assembly with attached rotating seal, a stator assembly with attached nonrotating seal and a nylon spacer.

A shaft of the rotor assembly extends out from the housing assembly and is connected to a rotating spindle of a stationary machine. Once this rotor assembly is secured, the housing assembly may then be mounted upon the associated stationary machine within a tolerance of ±0.06". Lastly, a fluid supply hose or pipe may be connectively received on the end of the housing assembly opposite that of the rotor assembly shaft.

The rotor assembly is designed to rotate freely within the housing assembly and is allowed some degree of both radial and axial movement in relation to its axis of rotation. However, the rotor assembly will be prevented from being completely extracted from the housing assembly through the presence of a motion-inhibiting nylon spacer.

The stator assembly of the present invention is positioned entirely within the housing assembly and is also allowed some degree of radial and axial movement with regard to the rotor assembly's axis of rotation. This stator assembly is not, however, allowed to rotate. Three biasing springs placed within the housing assembly force the stator assembly and its attached non-rotating seal against the rotating seal of the rotor assembly. As such, the seal faces associated with the rotating and non-rotating seals remain in constant, fluid-tight abutting relation.

During the machining operation, the rotor assembly and attached rotating seal rotate freely in conjunction with the rotating spindle. Fluid from the fluid supply hose or pipe then passes through the stator assembly, non-rotating seal, rotating seal and rotor assembly, and enters into the axial bore of the rotating spindle. Since it is not uncommon for such a rotating spindle to experience minor axial and radial deviations from its axis of rotation, the bearingless coolant union of the present invention is designed to accommodate such deviations by maintaining a "floating" fluid-tight seal between its rotating and non-rotating seal members.

It is therefore a general object of the present invention to provide a unitary, fully-assembled bearingless coolant union which has constantly engaged, relatively-rotating seals which are leak-tested at the production factory.

In addition, it is an object of the present invention to provide a bearingless coolant union which does not require the cleaning, oiling or alignment of its seals before its installation upon a tooling machine.

Another object of the present invention is to provide a bearingless coolant union that has a "floating" seal which can accommodate minor radial and axial movement of its rotor assembly without affecting its fluid-tight seal.

Moreover, an additional object of this invention is to provide a bearingless coolant union which has a set-up dimension tolerance of at least ±0.06".

It is a further object of the present invention to provide a bearingless coolant union which minimizes the amount of time it takes to replace the union and simultaneously maximizes the "up-time" of the corresponding machine.

Further objects and advantages of the invention will become apparent to those of ordinary skill in the pertinent art upon review of the following detailed description, accompanying drawing, and appended claims.

BRIEF DESCRIPTION OF THE DRAWINGS

FIG. 3 is a cross-sectional view of the straight-through housing of the present invention.

FIG. 4 is a left end view taken along line A of FIG. 3.

FIG. 5 is a right end view taken along line B of FIG. 3.

FIG. 6 is a cross-sectional view of the 90° housing of the present invention.

FIG. 7 is a left end view taken along line C of FIG. 6.

FIG. 8 is a right end view taken along line D of FIG. 6.

FIG. 14 is a cross-sectional view of the stator assembly of the present invention.

FIG. 15 is a right end view taken along line G of FIG. 14.

FIG. 16 is a cross-sectional view of the non-rotating seal of the present invention affixed to the stator assembly of FIG. 14.

FIG. 17 is a cross-sectional view of the non-rotating seal in accordance with the preferred embodiment of the present invention.

FIG. 18 is a right end view taken along line H of FIG. 17.

FIG. 19 is a cross-sectional view of the spacer of the present invention.

FIG. 20 is a right end view of the spacer taken along line I of FIG. 19.

Notice must taken that the figures are not necessarily to scale and that the embodiments are sometimes illustrated by phantom lines and diagrammatic representations. In certain instances, details which are not necessary for an understanding of the present invention or which will render other details difficult to perceive may have been omitted. It should be understood, of course, that the invention is not necessarily limited to the particular embodiments illustrated herein.

DETAILED DESCRIPTION OF THE DRAWINGS

Figure 1:
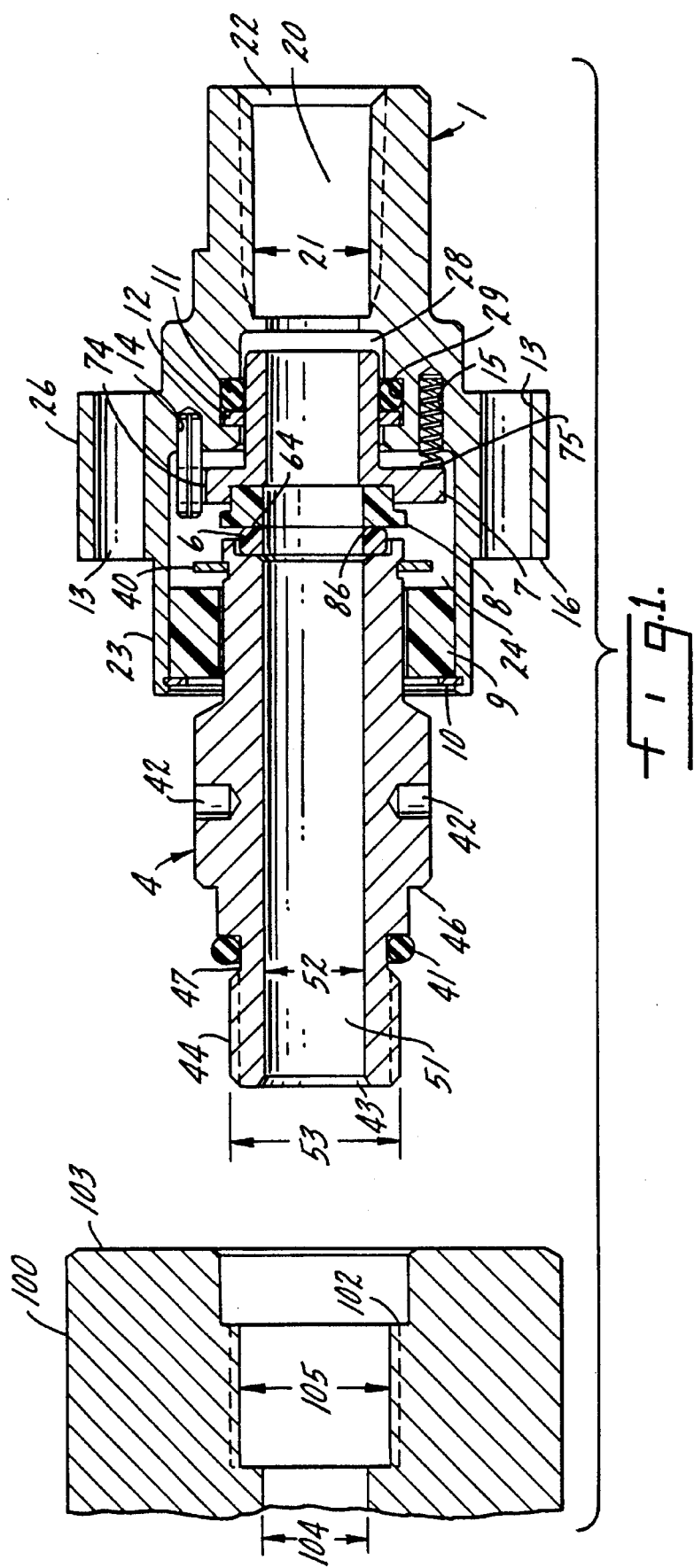
FIG. 1 is a longitudinal cross-sectional view of a straight-through bearingless coolant union and associated rotating spindle.

Turning first to FIG. 1, the bearingless coolant union of the present invention is there shown to include its primary components. Such components include straight-through housing 1, rotor assembly 4, rotating seal 6, stator assembly 7, non-rotating seal S, and spacer 9. It is critical to note that these primary components are held together as a "unitary" device. Indeed, mounted within cylindrical flange 23 of straight-through housing 1 is outer retaining ring 10 which prevents the removal of spacer 9 from straight-through housing 1. In turn, spacer 9 prevents rotor assembly 4 from being completely removed from straight-through housing 1 by restraining inner retaining ring 40 upon excessive outward movement of rotor assembly 4. Both before and after installation of the union, seal face 64 of rotating seal 6 remains in constant engagement with seal face 86 of non-rotating seal 8.

By manufacturing the union as a unitary device having permanently contacting and optically flat seal faces 64 and 86, dirt and chips are prevented from entering the union. A user can be assured that, after factory leak testing has been performed, the union will remain leak tight after installation. The time associated with the installation of the union is significantly reduced as the steps of cleaning, lubricating, aligning and shimming are eliminated.

Mounting of the union first requires that rotor assembly 4 be connected to spindle 100. Rotor edge 44 is affixed within spindle bore 105, through the use of cooperating screw threads, by inserting a spanner wrench into spanner wrench holes 42 and torquing rotor assembly 4 in the rotational direction necessary for insertion. Upon full insertion, O-ring 41 which is nested within O-ring groove 47 of rotor assembly 4 is in leak tight abutment with inlet edge 102 of spindle bore 105. Likewise, forward face 46 of rotor assembly 4 will be in direct contact with spindle face 103, and rotor chamber outlet 43 will be in direct communication with fluid bore 104.

Since the diameters of spindle bores vary depending on the type of machine tool involved, the bearingless coolant union is available with rotor assemblies 4 having a variety of chamber diameters 52 and outer diameters 53 to accommodate the majority of machining applications. The housing 1 associated with each different size of available rotor assembly 4 is uniquely color-coded such that quick and accurate replacement of the union may be accomplished by simply installing another union of the same color. The color carried by the housing 1 is an anodized coating which, as a side benefit, increases the corrosion resistance of the metal.

Once rotor assembly 4 is installed within spindle 100, straight-through housing 1 may then be mounted to the stationary machine associated with spindle 100. Mounting member 26, which is integrally-formed with straight-through housing 1, includes three equally-spaced bolt chambers 13 through which mounting bolts may secure housing 1 to a stationary machine. Mounting of straight-through housing 1 does not require the type of precision measurements associated with the installation of two-piece bearingless unions as its set-up dimension tolerance is considerably greater. The set-up dimension, that distance between forward face 46 of rotor assembly 4 and forward mounting surface 16 of housing 1, for the bearingless coolant union of the present invention is 1.22" with a tolerance of ±0.06". Conventional two-piece bearingless coolant unions typically have set-up dimension tolerances which are 4 to 10 times as sensitive, and also require detailed cleaning, oiling, and shimming procedures.

The rotary fluid union of FIG. 1 exemplifies the relative position of the various components during the union's operation. Stator assembly 7, and corresponding non-rotating seal 8, are non-rotatably secured within stator assembly pocket 28 by housing O-ring 11. Housing O-ring 11 is nested within O-ring groove 29 and prevented from being forced into housing cavity 24, due to high fluid pressure, by the adjacent positioning of backup ring 12. Rotational movement of stator assembly 7 is prevented as two roll pins which are housed within roll pin receptacles 14, become securely engaged within roll pin notches 74 of stator assembly 7. Seal face 86 of non-rotating seal 8 is subsequently maintained in permanent contacting relation with seal face 64 of rotating seal 6 as three springs, which are retained in spring receptacles 15, exert a biasing force upon rear surface 75 of stator assembly 7.

Referring again to FIG. 1, hose socket 20 has an inlet diameter 21 which is dimensioned to receive, through inlet opening 22, the cooperating male fitting of a fluid supply hose or pipe. During the rotating union's operation, fluid from the fluid supply hose or pipe passes through stator assembly 7, non-rotating seal 8, rotating seal 6, rotor assembly 4 and into fluid bore 104 of spindle 100.

Also during the union's operation, rotor assembly 4 and rotating seal 6 are rotating in conjunction with spindle 100. It is not uncommon for spindle 100 to experience minor movement either along its axis of rotation or in a radial direction which forces the spindle axis out of coincidence with the axis of rotation. The rotary fluid union of the present invention is specifically designed to accommodate both types of movement. Indeed, stator assembly 7 is allowed minor axial movement along the aforementioned axis of rotation via the biasing springs housed within spring receptacles 15. Furthermore, the union is designed to allow for the minor inclination of both rotating seal 6 and non-rotating seal 8 from a plane transverse to the axis of rotation in response to a minor misalignment of rotor assembly 4 from concentric relation with the axis of rotation.

This attribute is due, in part, to the equal spacing of the biasing springs outside of the flow conduit and behind stator assembly 7. These springs provide for even face loading upon seal face 86 of non-rotating seal 8 resulting in the ability of seal face 86 to "float" relative to the axis of rotation. This floating action maximizes the one-piece union's ability to keep a permanent, fluid-tight connection between seal face 64 and seal face 86 regardless of any axial or radial movement on the part of spindle 100.

Both rotating seal 6 and non-rotating seal 8 are manufactured of silicon carbide for extreme wear resistance at high speeds and pressures and to resist the effects of coolant contamination. Although coolant filtration is recommended for maximum life, the unitary, bearingless coolant union may be used in applications where filtration simply is not practical.

Figure 2:
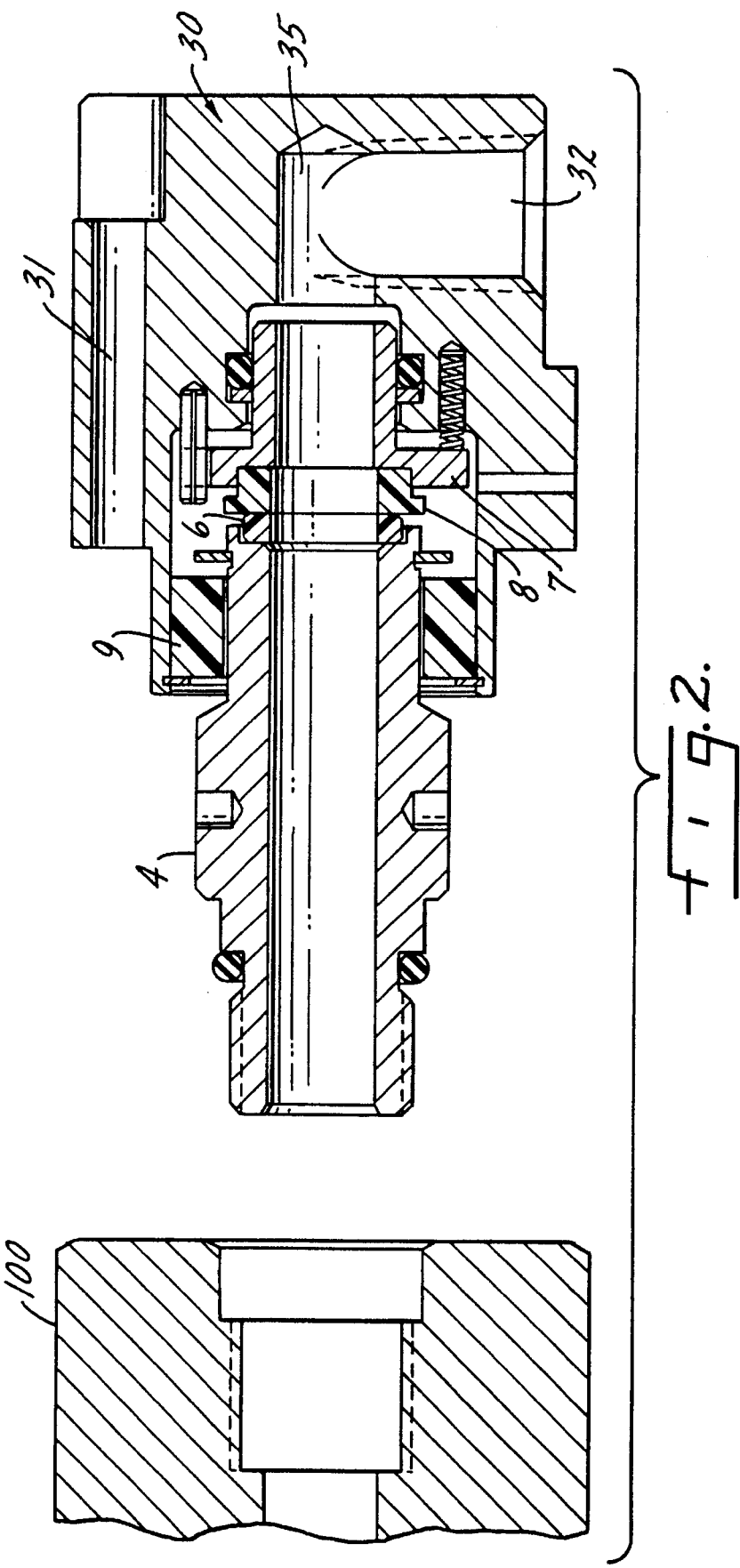
FIG. 2 is a longitudinal cross-sectional view of a 90° bearingless coolant union and associated rotating spindle.

FIG. 2 presents an alternative embodiment of the present invention wherein a fluid hose may be coupled into a side of the union through 90° housing 30. Specifically, hose socket 32 of 90° housing 30 is no longer concentric with housing chamber but rather positioned at a 90° angle thereto. Indeed, space considerations sometimes mandate that a machining application be configured as such. Though the 90° housing 30 has an elongated bolt chamber 31, the remaining components and dimensions of this union are otherwise identical to the corresponding union having a straight-through housing and include rotor assembly 4, stator assembly 7, rotating seal 6, non-rotating seal 8 and spacer 9.

Referring now to FIG. 3, a detailed cross-sectional view of straight-through housing 1 is shown. It should be noted that straight-through housing 1 may be mounted upon a stationary machine in one of two ways. Typically, forward mounting surface 16 Of mounting member 26 is placed against the face of such machine whereby mounting bolts are inserted, and secured, through bolt chambers 13 in a forward direction 17. Conversely, straight-through housing 1 may also be mounted such that rear mounting surface 18 is placed against the face of the machine whereby mounting bolts are then inserted through bolt chambers 13 in a rearward direction 19.

FIG. 3 also shows the relative internal dimensions of straight-through housing 1 including those dimensions associated with hose socket 20, stator assembly pocket 28, O-ring groove 29, and housing cavity 24. Housing cavity 24 includes a relatively flat inner surface 27 through which roll pin receptacles 14 and spring receptacles 15 are bored. Located at the end of cylindrical flange 23, and within housing cavity 24, is inner groove 25 into which outer retaining ring 10 is secured.

FIG. 4 is a left end view of the straight-through housing taken along line A of FIG. 3. Looking into this end of the straight-through housing 1, it can be seen that the three bolt chambers 13 are equally spaced (120° apart) around mounting member 26. Similarly, the three spring receptacles 15 are equally spaced (120° apart) within inner surface 27 of housing cavity 24. Also shown are two, oppositely-positioned roll pin receptacles 14 within inner surface 27 of housing cavity 24. Optimal operation of the biasing springs within spring receptacles 15 occurs when the two roll pin receptacles 14 are spaced as far apart from the two nearest spring receptacles 15 as possible (30°) while also being spaced 180° from each other.

FIG. 5 is a right end view of straight-through housing 1 taken along line B of FIG. 3 showing the relationship between such elements as hose socket 20, rear mounting surface 18 and bolt chambers 13.

Referring to FIG. 6, a detailed cross-sectional view of a 90° housing is shown. 90° housing 30 is intended only to be mounted in a forward direction whereby forward mounting surface 16 is placed against a stationary machine as a mounting bolt is inserted through elongated bolt chamber 31 in a forward direction 17. The bolt head of the mounting bolt is protectively retained within bolt head pocket 36 of 90° housing 30. As earlier indicated, 90° housing 30 has hose socket 32 which is at a 90° angle to its housing chamber 35. Hose socket 32 has a socket diameter 33 and is intended to connectively receive the male end of a fluid hose or pipe through socket opening 34. The other major internal dimensions of 90° housing 30 are identical to those of straight-through housing 1; specifically, housing cavity 24, stator assembly pocket 28, O-ring groove 29, roll pin receptacles 14 and spring receptacles 15.

FIG. 7 presents a left end view of 90° housing 30 taken along line C of FIG. 6 and shows the relative position of such elements as roll pin receptacles 14, spring receptacles 15, elongated bolt chambers 31 and housing chamber 35.

FIG. 8 presents a right end view of 90° housing 30 taken along line D of FIG. 6. Contrary to that of straight-through housing 1, this end of 90° housing 30 is substantially closed except for the equally-spaced elongated bolt chambers 31 and their corresponding bolt head pockets 36.

Figure 9:
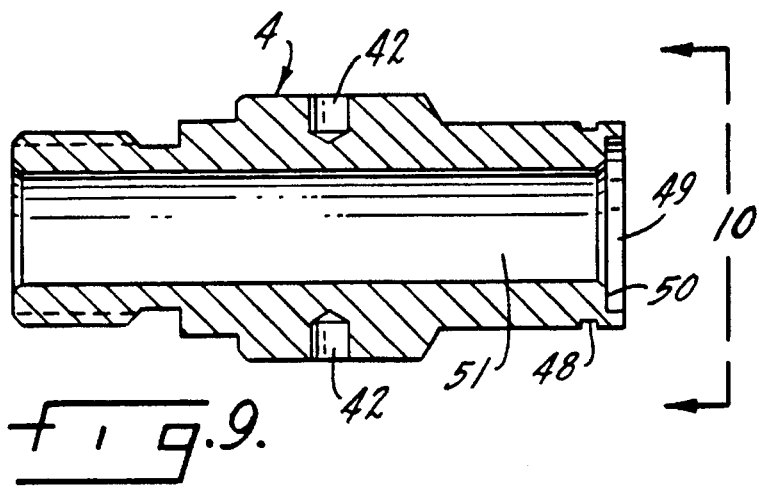
FIG. 9 is a cross-sectional view of the rotor assembly of the present invention.

FIG. 9 is a cross-sectional view of rotor assembly 4 detached from its housing. Spanner wrench holes 42 are positioned in the relative center of rotor assembly 4 to allow for the greatest amount of torquing force to be applied thereon. This view details retaining ring groove 48 which holds inner retaining ring 40, see FIG. 1. Rotor assembly 4 also includes a substantially circumferential seal pocket 49 into which rotating seal 6 may be affixed to the pocket's inner surface 50.

Figure 10:
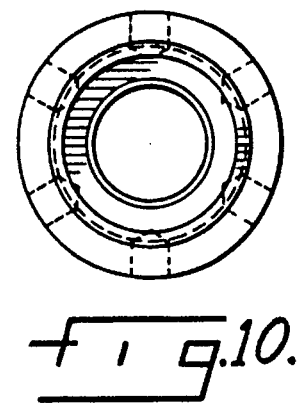
FIG. 10 is a right end view taken along line E of FIG. 9.

FIG. 10 is a right end view of rotor assembly 4 taken along line E of FIG. 9 and shows the equally-spaced positioning of the six spanner wrench holes 42 with respect to rotor chamber 51.

Figure 11:
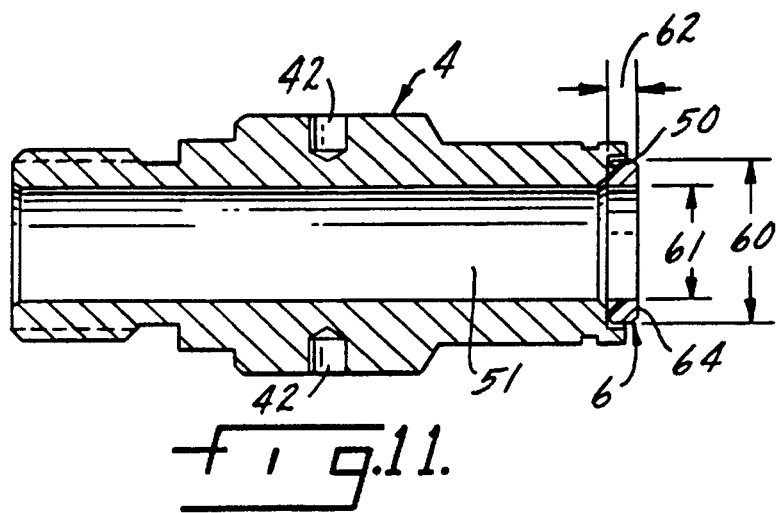
FIG. 11 is a cross-sectional view of the rotating seal of the present invention affixed to the rotor assembly of FIG. 9.

Turning now to FIG. 11, rotor assembly 4 is shown with attached rotating seal 6. Rotating seal 6 is adhesively affixed to the pocket's inner surface 50 of rotor assembly 4 such that its thickness 62 extends seal face 64 past the outermost edge of rotor assembly 4 to allow for unobstructed contact with a non-rotating seal. Associated with rotating seal 6 is an outer diameter 60 and an inner diameter 61. Inner diameter 61 is substantially equal to the diameter of rotor chamber 51 to allow for the smooth transfer of fluid therethrough.

Figure 12:
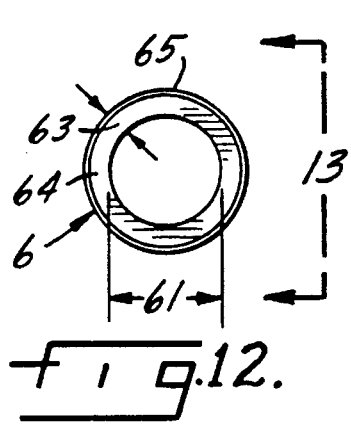
FIG. 12 is a view of the rotating seal in accordance with the preferred embodiment of the present invention.

FIG. 12 presents a view of rotating seal 6 in accordance with the preferred embodiment and shows inner diameter 61, seal width 63, seal face 64 and beveled edge 65. Rotating seal 6 is formed with beveled edge 65 to prevent the seal edges from chipping as the as rotor assembly 4 experiences minor misalignment from concentric relation with its axis of rotation. That is, the minor inclination of rotor assembly 4 may cause an additional biasing force to be created between an edge of rotating seal face 64 and stationary seal face 86. Rotating seal 6 with beveled edge 65 is less inclined to chip than a seal having a 90° edge.

Figure 13:
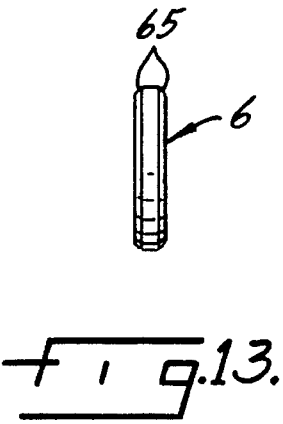
FIG. 13 is an edge view of the rotating seal taken along line F of FIG. 12.

FIG. 13 is an edge view of rotating seal 6 taken along line F of FIG. 12 and shows beveled edge 65 associated with both of the seal's edges.

FIG. 14 is a cross-sectional view of the present invention's stator assembly 7. Stator assembly 7 includes two roll pin notches 74 which straddle corresponding roll pins within the union's housing to prevent stator assembly 7 from rotating during the union's operation. Stator assembly 7 further includes both stator chamber 72 having a diameter 73 and seal pocket 70 within which non-rotating seal 8 may be affixed to the pocket's inner surface 71.

FIG. 15 is a right end view of stator assembly 7 taken along line G of FIG. 14. As indicated, roll pin notches 74 are positioned at opposite sides (180° apart) on the edge of stator assembly 7. Stator assembly 7 also includes two retaining edges 76 within seal pocket 70 which correspond to retaining edges of non-rotating seal 8 for secure affixation therein.

Referring to FIG. 16, a cross-sectional view of non-rotating seal 8 attached to stator assembly 7 is shown. Non-rotating seal 8 is adhesively affixed to stator assembly 7 along the pocket's inner surface 71. Non-rotating seal 8 has a thickness 83 which extends seal face 86 away from the outermost edge of stator assembly 7. Inner diameter 82 of non-rotating seal 8 is slightly larger than the inner diameter of stator assembly 7 to ensure the free flow of fluid from the fluid supply.

FIG. 17 is a cross-sectional view of non-rotating seal 8 and exemplifies the difference between mounting outer diameter 80 and external outer diameter 81. This greater external outer diameter 81 necessarily creates a larger seal face 86. This greater surface area helps to ensure the fluid tight, contacting relation between seal face 64 of rotating seal 6 and seal face 86.

FIG. 18 is a right end view taken along line H of FIG. 17 and again shows the difference between mounting outer diameter 80 and external outer diameter 81. Retaining edges 85 are formed within non-rotating seal 8 to correspond with retaining edges 76 formed within stator assembly 7 as previously indicated in FIG. 15.

Referring now to FIG. 19, a cross-sectional view of spacer 9 associated with the preferred embodiment of the present invention. Spacer 9, preferably manufactured of durable nylon, has an outer diameter 90 which is substantially equal to the inner diameter of housing cavity 24. In addition, spacer 9 has an inner diameter 91 which is slightly greater than the diameter of that portion of rotor assembly 4 which is maintained within housing cavity 24 to allow for the minor radial deflection of rotor assembly 4 from concentric relation with its axis of rotation. The thickness 92 of spacer 9 is such that it allows minor axial movement of rotor assembly 4 along its axis of rotation yet prevents the complete extraction of rotor assembly 4 from the union housing.

Lastly, FIG. 20 presents an end view of spacer 9 taken along line I of FIG. 19. Nylon spacer 9 has a very smooth surface 94 which, prior to installation, yet after factory leak testing, will be engaged with inner retaining ring 40, see FIG. 1. to prevent the extraction of rotor assembly 4 from the union housing. The width 93 of spacer 9 is designed to be slightly less than the difference between the inner diameter of housing cavity 24 and the diameter of that portion of rotor assembly 4 which is maintained within housing cavity 24.

The unique unitary design of the present invention allows the union to be factory leak-tested before it ever leaves the production facility. Indeed, in contrast to the two-piece nature of earlier bearingless union designs, the rotary union of the present invention is shipped to an end user in a fully-assembled condition whereby it simply may be removed from its package and installed upon a tooling machine. Such procedure does away with having to clean, oil, align and put into contact its relatively rotating seals.

It should be understood that the above-described embodiment is intended to illustrate, rather than limit, the invention and that numerous modifications could be made thereto without departing from the scope of the invention as defined by the appended claims. While the present invention has been illustrated in some detail according to the preferred embodiment shown in the foregoing drawing and description, it will become apparent to those skilled in the pertinent art that variations and equivalents may be made within the spirit and scope of that which has been expressly disclosed. Accordingly, it is intended that the scope of the invention be limited solely by the scope of the hereafter appended claims and not by any specific wording in the foregoing description.

We claim:

1. A unitary, fully-assembled rotary fluid union adapted to be coupled with, and transfer fluid to, a rotating member of a stationary machine, comprising:

(a) a bearingless rotor assembly having a rotating seal located on a proximate end and means for being connected to said rotating member, for rotation therewith, located on a distal end;

(b) a stator assembly having a non-rotating seal;

(c) a housing assembly having a first end receiving said rotor assembly and means for positioning both said stator assembly and said proximate end of said rotor assembly such that said rotating seal and said non-rotating seal are maintained in permanently-abutting relation to each other, said means for positioning allowing for the rotation of said rotor assembly and said rotating seal in conjunction with said rotating member while also retaining said proximate end of said rotor assembly within said housing assembly, the rotation of said rotor assembly and said rotating seal occurring within said housing assembly without the use of any bearings as said housing assembly is mounted and supported by said stationary machine and said rotor assembly is supported by said rotating member in a substantially concentric manner with said housing assembly, said housing assembly further including a second end having means for receiving an axial fluid shaft;

(d) means for biasing said rotating seal and said non-rotating seal against each other in fluid tight contacting relation for relative rotation therebetween; and (e) means for mounting said housing assembly to said stationary machine.

2. The unitary, fully-assembled rotary fluid union of claim 1, wherein said rotor assembly and said stator assembly each further include a fluid-transmitting bore having a central axis which is substantially concentric with an axis of rotation of said rotating member, said means for receiving an axial fluid shaft in said housing assembly being in direct communication with said fluid-transmitting bore of said stator assembly to facilitate the transfer of fluid from a fluid source through said fluid-transmitting bore of said stator assembly and through said fluid-transmitting bore of said rotor assembly to, ultimately, an axial bore of said rotating member.

3. The unitary, fully-assembled rotary fluid union of claim 2, wherein said means for positioning both said stator assembly and said proximate end of said rotor assembly allows for minor outward and inward movement of both said stator assembly and said rotor assembly along said axis of rotation in conjunction with said rotating member such that said rotating seal is maintained in fluid-tight contacting relation with said non-rotating seal to inhibit axial gaps from forming therebetween which might otherwise be caused by the minor movement of said rotating member along said axis of rotation.

4. The unitary, fully-assembled rotary fluid union of claim 3, wherein said means for positioning both said stator assembly and said proximate end of said rotor assembly further allows for the minor inclination of both said rotating seal and said non-rotating seal from a plane transverse to said axis of rotation in response to a minor misalignment of said rotating member from concentric relation with said axis of rotation such that said rotating seal is maintained in fluid-tight contacting relation with said non-rotating seal to inhibit V-shaped gaps from forming therebetween which might otherwise be caused by the radial deflection of said rotating member from axial alignment with said axis of rotation.

5. The unitary, fully-assembled rotary fluid union of claim 4, wherein said means for positioning both said stator assembly and said proximate end of said rotor assembly includes a first retaining ring and a spacer bushing and wherein said rotor assembly includes a second retaining ring, said first retaining ring being securely nested within said first end of said housing assembly in a plane transverse to said axis of rotation and encircling said proximate end of said rotor assembly in spaced-apart relation, said second retaining ring being rotatively coupled to an external circumferential surface of said proximate end of said rotor assembly, said spacer bushing being securely nested within said first end of said housing assembly inward of said first retaining ring yet outward of said second retaining and encircling said proximate end of said rotor assembly in spaced apart relation to allow for the minor misalignment of said rotating member from concentric relation with said axis of rotation, said spacer bushing becoming engaged with said second retaining ring as said rotor assembly is moved outward along said axis of rotation to prevent the complete removal of said proximate end from said housing assembly and to maintain said rotating seal in fluid-tight contacting relation with said non-rotating seal.

6. The unitary, fully-assembled rotary fluid union of claim 5, wherein said means for biasing said rotating seal and said non-rotating seal against each other comprises multiple equally-spaced coil springs recessively maintained within said housing assembly, said springs located outside the flow of fluid within said fluid-transmitting bore of said stator assembly and exerting a uniform axial force upon said stator assembly in a direction toward said rotor assembly.

7. The unitary, fully-assembled rotary fluid union of claim 6, wherein said union has a set-up dimension tolerance of at least ±0.06".

8. A method of transferring fluid from a fluid source to an axial bore within a rotating member of a stationary machine, which comprises:

(a) connecting a distal end of a bearingless rotor assembly to a rotating member of a stationary machine for rotation therewith, said rotor assembly including a fluid-transmitting bore and a proximate end having a rotating seal, said rotating seal being in permanently-abutting relation to a non-rotating seal of a stator assembly, said stator assembly having a fluid-transmitting bore being substantially concentric with said fluid-transmitting bore of said rotor assembly, said stator assembly and said proximate end of said rotor assembly being accommodated within a housing assembly as a unitary and fully-assembled unit, said housing assembly including means for receiving an axial fluid shaft and allowing for the rotation of said rotor assembly and said rotating seal in conjunction with said rotating member, the rotation of said rotor assembly and said rotating seal occurring within said housing assembly without the use of any bearings as said housing assembly is mounted and supported by said stationary machine and said rotor assembly is supported by said rotating member in a substantially concentric manner with said housing assembly, said housing assembly further including means for retaining said proximate end of said rotor assembly within said housing assembly wherein said rotating seal and said non-rotating seal are biased against each other in fluid-tight contacting relation for relative rotation therebetween;

(b) mounting said housing assembly in said concentric manner to said stationary machine; and (c) attaching an axial fluid shaft to said means for receiving an axial fluid shaft on said housing.

9. The method of transferring fluid from a fluid source to an axial bore within a rotating member of a stationary machine of claim 8, wherein said housing assembly allows for the minor outward and inward movement of both said stator assembly and said rotor assembly in conjunction with said rotating member along an axis of rotation of said rotating member such that said rotating seal is maintained in fluid-tight contacting relation with said non-rotating seal to inhibit axial gaps from forming therebetween which might otherwise be caused by the minor movement of said rotating member along said axis of rotation.

10. The method of transferring fluid from a fluid source to an axial bore within a rotating member of a stationary machine of claim 9, wherein said housing further allows for the minor inclination of both said rotating seal and said non-rotating seal from a plane transverse to said axis of rotation in response to a minor misalignment of said rotating member from concentric relation with said axis of rotation such that said rotating seal is maintained in fluid-tight contacting relation with said non-rotating seal to inhibit V-shaped gaps from forming therebetween which might otherwise be caused by the radial deflection of said rotating member from axial alignment with said axis of rotation.

11. The method of transferring fluid from a fluid source to an axial bore within a rotating member of a stationary machine of claim 10, wherein said method does not require the cleaning, oiling or aligning of said rotating seal and said non-rotating seal prior to said mounting of said housing assembly to said stationary machine.

12. The method of transferring fluid from a fluid source to an axial bore within a rotating member of a stationary machine of claim 11, wherein said rotor assembly and said housing assembly have a set-up dimension tolerance of at least ±0.06".

* * * * *